United States Patent [19]
Barandiaran

[11] Patent Number: 5,833,322
[45] Date of Patent: Nov. 10, 1998

[54] GAS CYLINDER

[75] Inventor: Javier Barandiaran, San Sebastian, Spain

[73] Assignee: Gain Gas Technique, S.L., Lezo, Spain

[21] Appl. No.: 835,428

[22] Filed: Apr. 9, 1997

[30] Foreign Application Priority Data

Apr. 11, 1996 [ES] Spain ..................................... 9600826

[51] Int. Cl.$^6$ .............. F16M 11/00; A47C 1/02
[52] U.S. Cl. ................. 297/463.1; 297/344.19; 248/161; 248/406.2
[58] Field of Search ........................ 297/344.18, 344.19, 297/463.1; 248/161, 406.2, 157

[56] References Cited

U.S. PATENT DOCUMENTS

| | | | |
|---|---|---|---|
| 4,756,496 | 7/1988 | Hosan et al. ........................ | 297/344.19 |
| 4,899,969 | 2/1990 | Bauer et al. ........................ | 297/344.19 |
| 4,964,015 | 10/1990 | Crooker et al. ..................... | 297/344.19 |
| 5,556,170 | 9/1996 | Lai et al. ............................ | 297/344.19 |

FOREIGN PATENT DOCUMENTS

| | | | |
|---|---|---|---|
| 624329 | 11/1994 | European Pat. Off. .......... | 297/344.19 |
| 9001140.6 | 4/1990 | Spain . | |

*Primary Examiner*—Peter M. Cuomo
*Assistant Examiner*—Anthony D. Barfield
*Attorney, Agent, or Firm*—Jacobson, Price, Holman & Stern, PLLC

[57] ABSTRACT

A gas cylinder with an outer steel tube which has its lower end of a smaller diameter. Into the upper end of the tube a plastic bushing provided with longitudinal radial ribs is inserted under pressure. This bushing has two annular reinforcing portions separated a certain distance from each other, with the ribs being situated further back in this separation, so that staggered housings are produced all around the profile, in which hook-type fins are received, with semi-punched material on the wall of the tube. At the lower end, an inverted bowl is placed, with its edge supported on a flange on the end of the tube.

4 Claims, 2 Drawing Sheets

GAS CYLINDER

FIELD OF THE INVENTION

The invention relates to gas cylinders of the type used in several kinds of applications, for example in the control and regulation of pieces of furniture, chairs and similar.

BACKGROUND OF THE INVENTION

Within this technique, gas cylinders are known which are composed basically of a steel tube, into the upper end of which a plastic bushing is inserted and becomes housed inside the tube. In the same way, in these cylinders, the lower end is made with an area of a smaller diameter, on which, traditionally, a flat circular part is situated, by way of a washer, welded to the interior of the tube, with the lower end of the shaft passing through it, receiving a holding washer for the position of the shaft.

The plastic bushing at the upper end is housed in the end of the tube under pressure, with its side surface being provided with a series of reinforcing radial ribs, placed longitudinally. For its final securing, the outer tube is drilled so that a metal pin can be inserted, responsible for keeping the bushing immobile.

More recently, the bushing has been provided with a circumferential reinforcement close to its upper end, that provides a series of regularly distributed spaces between the longitudinal ribs. For its part, some fins are made in the steel tube, protruding towards the interior, based on the same semi-punched material of the tube itself, with these fins being received in the previously mentioned spaces. For the fins to be housed in the corresponding spaces, it is necessary to make the position of the semi-punchings coincide with the position of the spaces, so therefore to facilitate assembly, a set of windows are cut in the outer front of the plastic bushing, communicating with the spaces or housings, so that the fins can be seen through them and their position can be made to coincide with that of the housings and later the bushing can be inserted by pressure into the tube.

The solution of the pin mentioned in the first place is, obviously, costly, both in manufacture and in assembly. This is improved in the second and later proposal, which, however, also has disadvantages.

The disadvantages of this second solution lie in the fact that it is necessary to find the exact position of correspondence between the windows and the housings, which involves excessive assembly time. Apart from this, the provision of the windows reduces the strength of the upper portion of the bushing, especially when the user sits down on the chair, which is the moment when this portion is submitted to the greatest stresses.

On the other hand, and in relation to the washer or clip on the lower end of the shaft, the circumstance often occurs that as the shaft is generally protruding from the end, it makes contact with the floor. If the floor is wooden, it becomes scratched by the contact of the end of the shaft and the clip, whereas if there is carpet or fitted carpet, the frequent friction and rubbing it is subjected to will eventually wear and then break it.

More recently, in order to avoid these disadvantages, a solution has been divised, directed at raising the end of the shaft and the clip, by situating the circular metal washer further towards the interior of the lower end of the tube. To do this, the end of the tube is provided with a collar folded upwards so that the end of this collar that becomes drawn into the interior, acts as a support for the metal washer, which, therefore, is distanced from the end of the tube.

The disadvantages of this practice are that it is costly for both manufacture and assembly.

SUMMARY OF THE INVENTION

One object of the invention, therefore, is to provide a bushing, usually made of plastic, which can be inserted quickly into the tube of the cylinder.

Another object of the invention is to provide a bushing which reinforces its upper end, which is exposed to the greatest strength requirements.

Another object of the invention is to provide a bowl-shaped part, known in itself, in an inverted position, to house the end of the shaft.

As regards this final objective, and for the appropriate purposes, it is pointed out that Spanish patent P.9001140.6, in favour of the applicant, shows a bowl arranged on the lower end of the shaft, which will be described more fully later. The said document also shows the bushing surrounding the gas cylinder and in turn clasped by the outer steel tube and secured to it by means of a riveted pin.

In order to achieve the first objective of the invention, the plastic bushing, which is provided with radial reinforcements extending longitudinally, has a circumferential reinforcing support a certain distance from its upper end, as well as another circumferential reinforcing support which is established as a continuation of its upper end. The longitudinal ribs stand out below the lower circumferential support and in the space between the two ribs, with the particularity that in this space, the ribs are drawn in with their front surface moved back a certain length.

In accordance with this arrangement, in the space or between the reinforcements, two housings are formed which totally occupy the circular perimeter of the bushing some created between the drawn back ribs and others formed by the ribs themselves, which are alternated in the perimeter.

The steel tube, for its part, includes at least one hook-type fin made with the semi-punched material of its side wall, with this fin protruding towards its interior. On inserting the bushing, under pressure, into the interior of the tube, the fin becomes housed in the space between the reinforcements in any of the housings, either in those between the ribs or in those of the ribs themselves and without any special care being taken as regards the position for assembly.

As regards the second objective, this is achieved by the provision of the upper perimetral reinforcement close to the highest end of the bushing, which is of sufficient size to be able to resist any mechanical stress.

In relation to the third objective, we return to the contents of patent P.9001140.6 in favour of the applicant himself, in which, at its lower end, the front of the tube is bent back with a bead or ledge that extends in a perpendicular direction in relation to the longitudinal axis of the cylinder shaft, thus establishing an internal seating on which a bowl-shaped metal part is received.

Both the bead and the bowl are provided with central holes. The one in the bowl is to allow the shaft to be seated and to act as support for an end bearing and the one in the bead to also allow the shaft to pass through and the provision of a clip-type washer.

The bowl is arranged with the opening upwards, in such a way that its edge is secured by notches made in the steel tube.

In accordance with the invention, the third objective of the invention is achieved by simply using the bowl in the opposite direction to the usual one, i.e. with the opening downwards and its base perforated upwards. In this case, the notches in the steel tube exert pressure against the edges of the base, thus achieving that the base of the bowl is drawn back to the interior of the tube and withdrawn in relation to the end of the tube.

This distancing of the end also allows the distancing of the end clip on the shaft with its outlet, so that the disadvantages mentioned at the beginning are avoided completely.

On the other hand, the lower end of the lower circumferential reinforcement on the bushing is provided with a chamfer, by means of which the insertion of the bushing is facilitated and the integrity of the rib or reinforcement is preserved.

On its part, the inner lower end of the central cavity of the bushing has a concave curved cut-out that facilitates the finish of machining on allowing the withdrawal of the blade used for this purpose.

BRIEF DESCRIPTION OF THE DRAWINGS

All these and other details will be understood with greater clarity with reference to the accompanying sheets of drawings, in which the following are represented for guidance only.

DETAILED DESCRIPTION OF THE DRAWINGS

Figure 1:
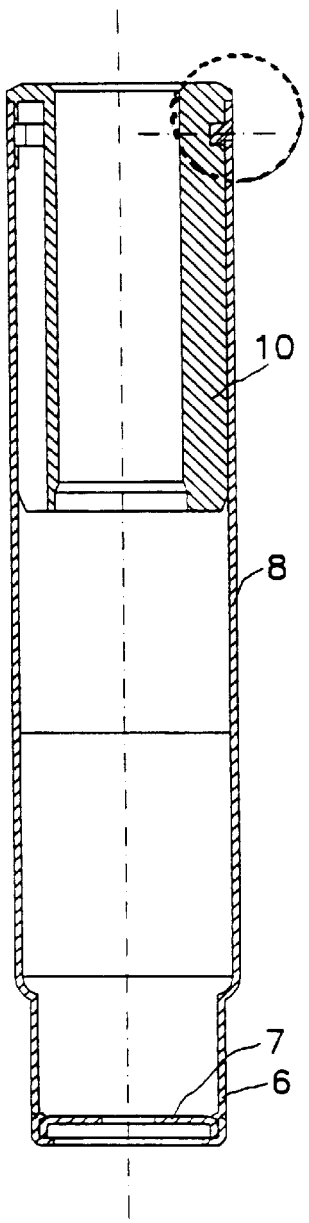
FIG. 1 is the section elevation of the steel tube with the plastic bushing, in accordance with the invention.

Looking now at FIG. 1, we can appreciate the steel tube (8) with its lower end (6), the upper bushing (10) and the bowl (7) with the opening downwards. The engagement and connection between the tube and the bushing are shown inside a circle and later enlarged in FIG. 4.

Figure 2:
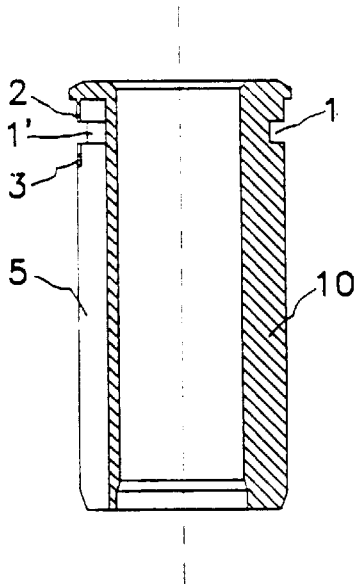
FIG. 2 is a section elevation of the bushing, in accordance with the invention.
Figure 3:
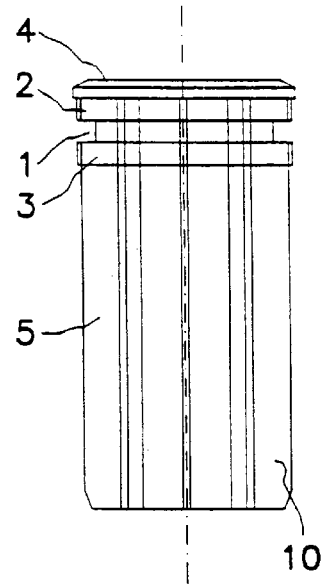
FIG. 3 is an elevation of the exterior of the bushing.
Figure 5:
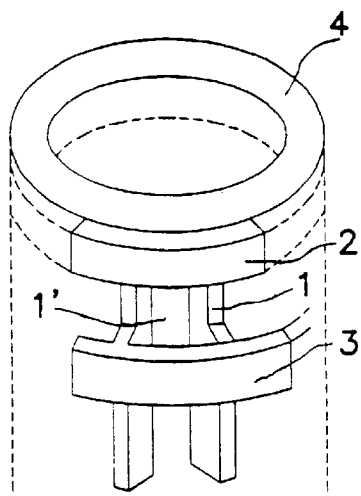
FIG. 5 shows a diagramatical perspective of the upper part of the bushing.

In FIGS. 2, 3 and 5 we can observe the special configuration of the bushing (10) with its longitudinal radial fins (5) and the two circumferential reinforcements, the upper one (2) and the lower one (3). The upper reinforcement (2) is established as a continuation of the upper front end (4) of the bushing and the lower reinforcement (3) is a certain distance or space from it.

In this space the fins (5) are moved back, FIG. 5, which can be easily appreciated, providing recesses around the whole circumference of this space. In the space between the reinforcements, housings (1,1') are provided, corresponding to the gaps between the ribs and to the ribs themselves, with it being possible for the hook-type fin from the steel tube to be housed in either of these.

Figure 4:
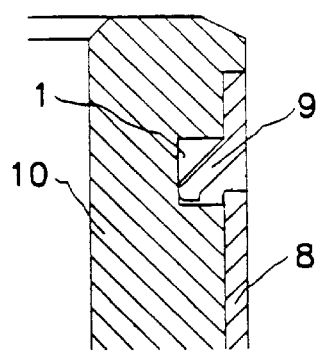
FIG. 4 is an enlarged detail of the connection between the tube and the bushing.

The mutual fit of the fin (9), FIG. 4, in the housing (1), for instance, in perfectly defined. On the bushing being housed by pressure in the interior of the tube, the bushing is deformed, not permanently, so that in any position, the fin (9) becomes lodged in any of the housings (1,1').

Figure 6:
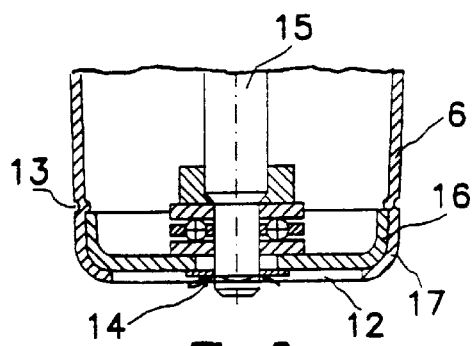
FIG. 6 is a cross-section of the lower end of a cylinder, in accordance with the previous technique described in patent P.9001140.

As regards FIG. 6, we can observe the lower end of a conventional cylinder, which at this end is bent (17) in a perpendicular direction to the shaft (15) of the cylinder, receiving the bowl (16) in its interior. The shaft is supported by means of the bearing, not numbered, in the base of the bowl (16) and this is secured to the interior of the tube (6) by means of the notches (13). The clip (14) is connected to the protruding end, resting on the inner base of the bowl.

Figure 7:
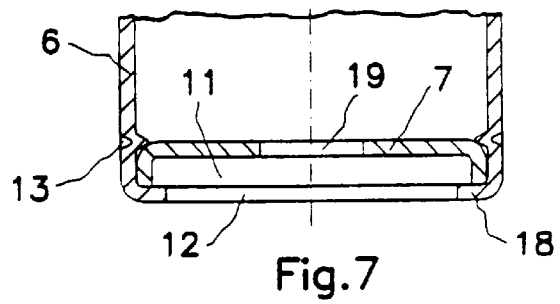
FIG. 7, finally, represents an enlarged detail of the end of the cylinder, in accordance with the invention.

In FIG. 7 it is possible to appreciate the behaviour of the invention, with the bowl (7) in the opposite direction, with the opening upwards and with the notches securing the outer perimeter of its base. The hole (19) allows the shaft to pass through and the bearing is supported on its upper face. The space (11) distanced from the end allows the end of the shaft to be accommodated with the corresponding clip, being distanced from the lower end (12) of the cylinder. The perfect seating of the bowl on the edge (18) of the tube can also be appreciated.

Figure 8:
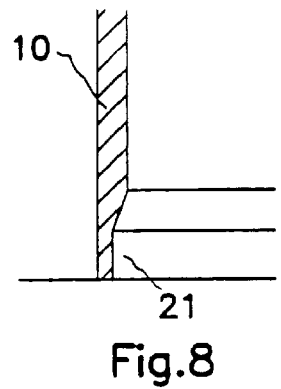
FIG. 8 shows an enlarged detail of the inner lower end of the bushing.

With regard to FIG. 8, we can appreciate the concave curved cut-out (21) at the inner lower end of the bushing (10), which facilitates the finish of the bushing and provides better fit and tolerance.

Figure 9:
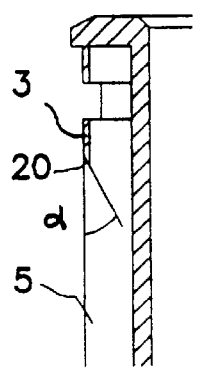
FIG. 9 is also a detail representing the lower chamfer of the lower circumferential reinforcement on the bushing.

On FIG. 9, we wish to emphasize the chamfer (20) carried out in accordance with the angle ($\alpha$) on the lower reinforcement (3) of the bushing (10), by which it is easier to insert the bushing into the tube (8).

It is important to point out, once having described the nature and advantages of this invention, its non-restrictive character, inasmuch as changes in the shape, materials or dimensions of its constituent parts will not in any way alter its essence, as long as they do not mean a substantial variation of the whole assembly.

I claim:

1. Gas cylinder comprising:

an outer steel tube, plastic bushing provided with radial ribs arranged longitudinally, said plastic bushing being housed by pressure in an upper end of said outer steel tube and secured in said outer steel tube by at least one fin deformed from an exterior wall of said outer steel tube to project into an interior of said outer steel tube and engaging said plastic bushing to secure said plastic bushing in place, a lower end of said outer steel tube having a smaller diameter than said upper end, a washer having a central, totally flat portion and downwardly projecting side flanges extending therefrom with an opening defined in the flat portion, the washer being placed, with the opening and the flat portion projecting towards the interior of the outer steel tube, the side flanges of the washer being supported on a folded, radially inwardly projecting portion of the lower end of the outer steel tube, the washer being a seating for an end of a cylinder shaft projecting through the opening of the flat portion of the washer and secured in place by a clip supported on a lower surface of the washer, the washer being secured to the outer steel tube by a series of notches projecting radially inwardly into the outer steel tube, the plastic bushing including a first circular reinforcement support located close to an upper end of the bushing and a second circular reinforcement support extending parallel to the first supports, providing a space between the first and second support, a radially outermost surface of the longitudinal radial ribs being recessed towards a centre of the bushing in said space to form two types of housings between the first and second supports, with one of the housings corresponding to a position of the recessed, radially outermost surface of the ribs between the first and second supports and the other of the housings, of greater depth, corresponding to spaces between the ribs and between the first and second supports, with the housings receiving at least one said fin projecting from the wall of the outer steel tube and protruding radially inwardly, the washer located at the lower end of the outer steel tube being arranged with the opening in the flat portion extending upward so that side flanges of the washer rest on the folded, radially inwardly projecting portion of the lower end of the outer steel tube, and separating the flat portion of the washer from the lower end of the outer steel tube by a certain distance so that the clip can be received on the end of the shaft without the clip protruding below the lower end of the outer steel tube.

2. Gas cylinder, in accordance with claim 1, wherein an upper surface of the washer engages the notches made in the lower end of the outer steel tube to secure the washer in place.

3. Gas cylinder, in accordance with claim 1, wherein the folded, radially inwardly projecting portion of the lower end of the outer steel tube extends in a perpendicular direction to a direction of the cylinder shaft.

4. Gas cylinder, in accordance with claim 1, wherein a lower inner end of the bushing has a curved cut-out and a lower end of the second support of the bushing is provided with a bevel, extending at an angle starting from an exterior surface.

* * * * *